United States Patent [19]

Kunkel

[11] Patent Number: 5,048,221

[45] Date of Patent: Sep. 17, 1991

[54] CATCH AND RELEASE TRAP

[76] Inventor: Vincent J. Kunkel, 19075 East Shore Dr., Kimball, Minn. 55353

[21] Appl. No.: 460,358

[22] Filed: Jan. 3, 1990

[51] Int. Cl.⁵ ............................................. A01K 97/14
[52] U.S. Cl. ...................................... 43/6; 294/110.1; 294/19.3
[58] Field of Search ...................... 43/5, 6; 294/110.1, 294/19.1, 19.3

[56] References Cited

U.S. PATENT DOCUMENTS

| | | | |
|---|---|---|---|
| 2,584,881 | 2/1952 | Johnson | 294/19.3 |
| 2,616,753 | 11/1952 | Odneal | 294/19.3 |
| 2,730,399 | 1/1956 | Inman | 294/19.3 |
| 3,041,102 | 6/1962 | Day | 294/19.3 |
| 4,783,926 | 11/1988 | McKinney | 294/19.3 |
| 4,834,437 | 5/1989 | Howard | 294/110.1 |
| 4,934,089 | 6/1990 | Sanrar | 294/110.1 |

Primary Examiner—Kurt Rowan
Attorney, Agent, or Firm—Dorsey & Whitney

[57] ABSTRACT

An apparatus for releasibly grasping objects has an elongated handle having a first end with a pair of grasping hands and a second end. Each hand has a stem end pivotally connected to the first end of the handle and a grasping end. Closer force means is operably connected to the handle and the grasping hands for selectively exerting a force tending to bring together the grasping ends of the grasping hands. Trigger means is operably connected to the grasping hands for selectively opposing the force means and holding the grasping ends of the grasping hands apart. The trigger means is responsive to contact with an object located between the grasping ends of the grasping hands to cease selectively opposing the force means and to permit the grasping ends to pivot rapidly toward each other.

15 Claims, 2 Drawing Sheets

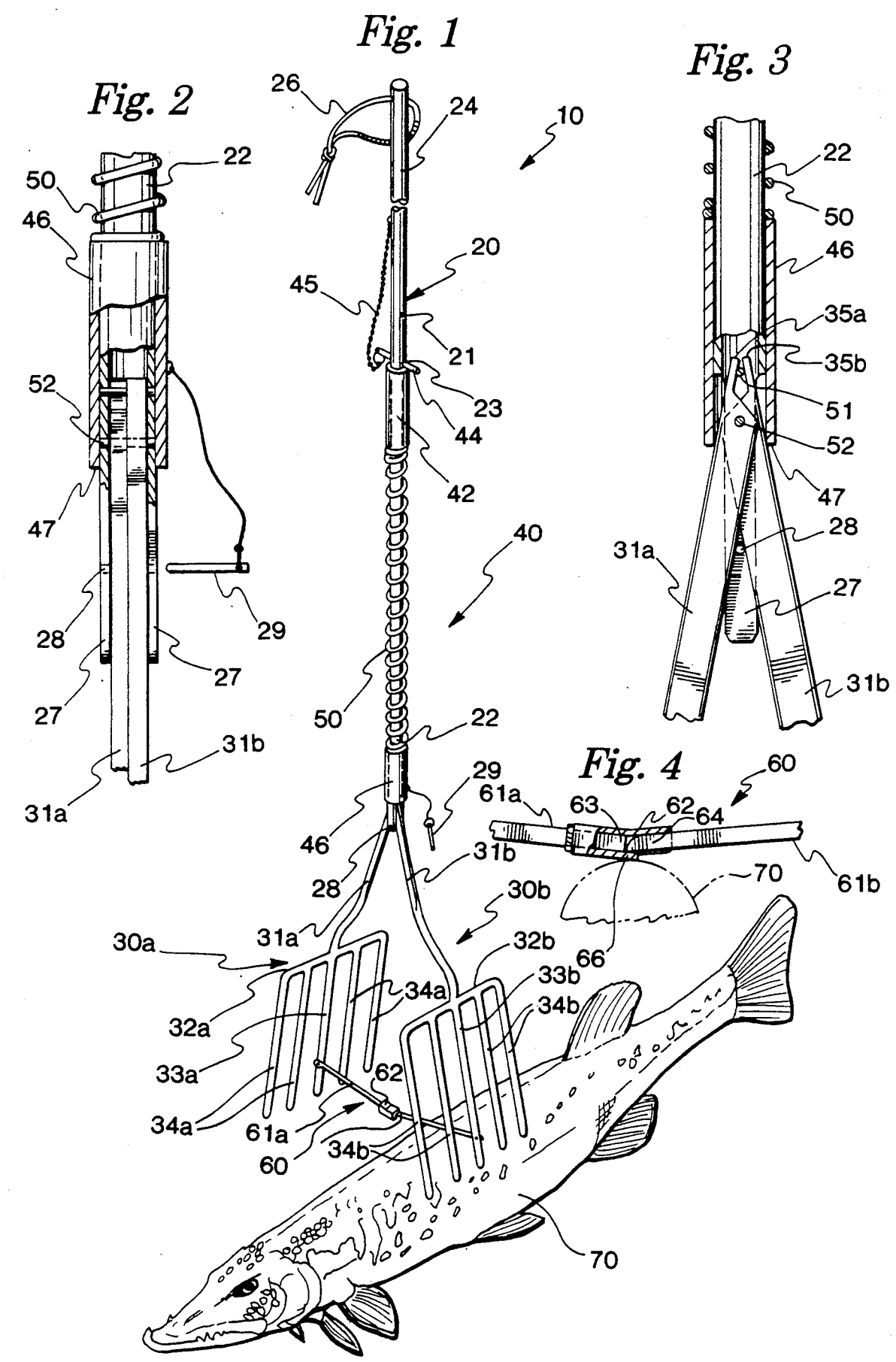

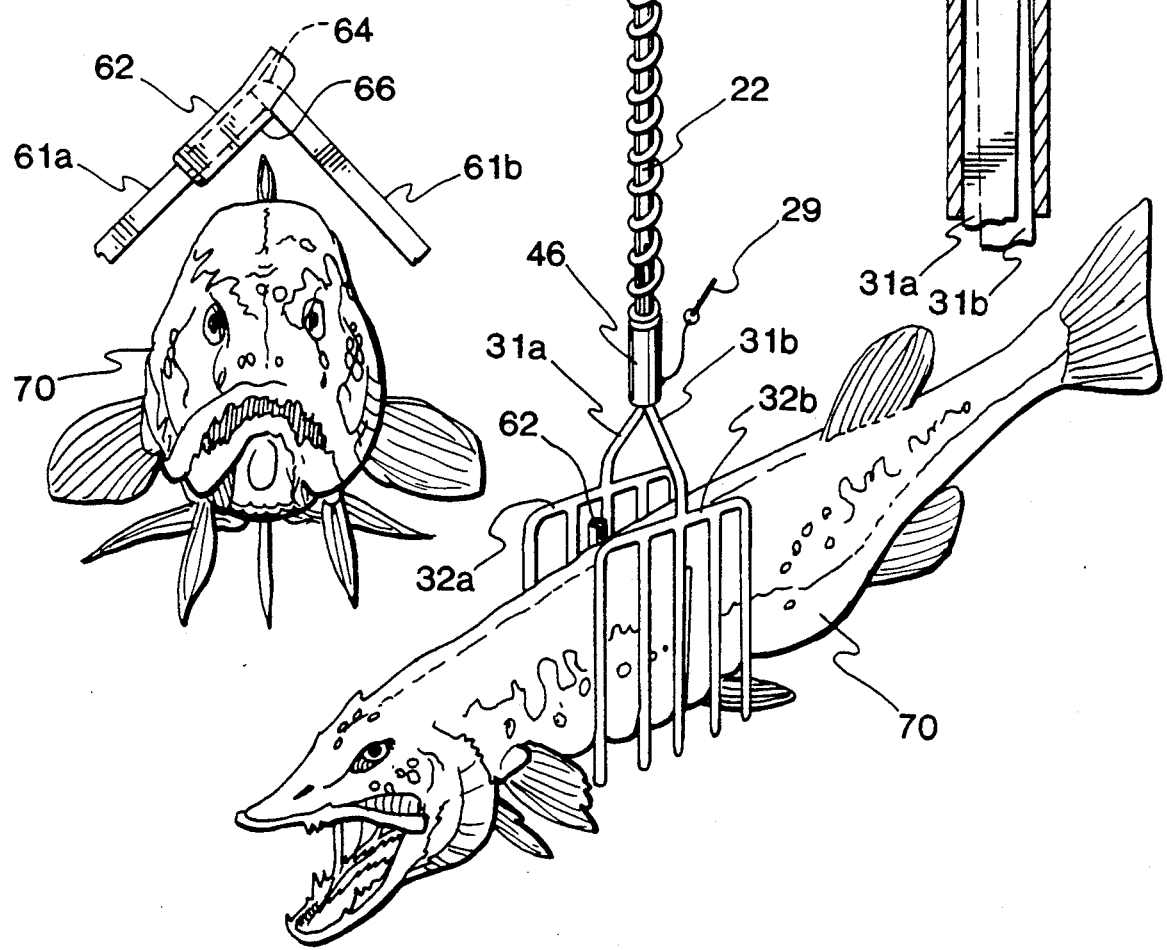

CATCH AND RELEASE TRAP

BACKGROUND OF THE INVENTION

1. Field of the Invention

This invention relates generally to an apparatus for capturing objects by grasping them. More particularly, this invention relates to an apparatus for catching fish or other objects by grasping them in such a manner that they are essentially unharmed and may be released.

2. Description of the Prior Art

It is known in the prior art to use long handled spears to catch fish, frogs or other water creatures. The use of such spears almost always results in the death of the captured creature. In many jurisdictions the use of such spears is forbidden or sharply regulated. Yet there is a desire on the part of sportsman to have a device that can be projected or thrown like a spear to hunt fish. There is also a desire on the part of those that work with fish in hatcheries or in the wild to have a tool that permits them to extend the normal reach of a person and to capture fish efficiently for examination or other such purposes.

While various forms of nets or other devices for catching fish are known, these can not usually be swiftly deployed to catch a single fish, especially when the fish is not at the surface of the water. Accordingly, it would be advantageous to have an extended reach tool that could be used to capture fish by grasping them so that they remain essentially unharmed and can be released to return to their habitat.

SUMMARY OF THE INVENTION

In accordance with the present invention, an apparatus for releasibly grasping objects has an elongated handle having a first end carrying a pair of grasping hands and a second end. Each grasping hand has a stem end pivotally connected to the first end of the handle and a grasping end. Closer force means is operably connected to the handle and the grasping hands for selectively exerting a force tending to bring together the grasping ends of the grasping hands. Trigger means is operably connected to the grasping hands for selectively opposing the force means and holding the grasping ends of the grasping hands apart. The trigger means is responsive to contact with an object between the grasping ends of the grasping hands to cease selectively opposing the closer force means and to permit the grasping ends to pivot rapidly toward each other.

It is an objective of the present invention to provide an apparatus that can be used to capture or land fish without injury so that they can be released after capture.

It is another objective of the invention to provide an apparatus that permits individual fish to be captured when they are swimming somewhat below the surface of the water.

It is a further objective of the invention to provide an apparatus for catching fish that can be thrown or deployed like a spear but that captures nonlethally.

It is still another objective of the invention to provide an apparatus that can be used to grasp objects or appendages when standing at a distance from the objects or appendages.

These and other objects and purposes of the invention will become more apparent in the following description of the preferred embodiment of the invention.

DESCRIPTION OF THE DRAWINGS

FIG. 1 is a perspective view of the present invention set to close on and capture a fish.

FIG. 2 is a fragmentary detail of the present invention with parts cut away showing a side view of the closer sleeve and adjacent parts.

FIG. 3 is a fragmentary detail of the present invention with parts cut away showing a front view of the closer sleeve and adjacent parts.

FIG. 4 is a fragmentary detail of the trigger mechanism of the present invention.

FIG. 5 is a fragmentary detail of the trigger mechanism of the present invention responding to contact with a fish.

FIG. 6 is a perspective view of the present invention closed on and capturing a fish.

FIG. 7 is a fragmentary detail of the compression mechanism of the present invention after the trigger mechanism has been tripped.

DESCRIPTION OF THE PREFERRED EMBODIMENT

As best seen in FIG. 1, the present invention comprises a catch and release trap 10 that has an elongated handle 20 with a first end 22 and a second end 24. The handle 20 may be in one piece or in several sectional lengths to permit it to be taken apart for easier transport. It may also include add-on sections (not shown) for extending reach. At the first end 22 of the handle 20 a pair of grasping hands 30a, 30b is pivotally connected. Closer force means 40 is operably connected to the handle 20 and to the grasping hands 30a, 30b and is designed to exert a force tending to bring together grasping ends 32a, 32b of the grasping hands 30a, 30b. A trigger mechanism 60 is operably connected to the grasping hands 30a, 30b for selectively opposing the closer force means 40 and holding the grasping ends 32a, 32b apart. The trigger mechanism 60 is responsive to contact with an object, such as a fish 70, between the grasping ends 32a, 32b to cease selectively opposing the closer force means 40 and to permit the grasping ends 32a, 32b to pivot rapidly toward each other.

As best seen in FIGS. 1-3, each grasping hand 30a, 30b comprises a stem end 31a, 31b that is pierced by and pivots on a stem pivot pin 52 that passes through a pair of handle extension leaves 27, 27 at the first end 22 of the handle 20. Each stem end 31a, 31b terminates in a stem stop tab 35a, 35b that bears against a centering stop pin 51 when the grasping ends 32a, 32b are spread apart. The stop pin 51 limits the extent to which the grasping hands 30a, 30b can be pivoted apart and centers them when they are separated. Each grasping end 32a, 32b comprises a fork-like structure with a main tine 33a, 33b, respectively, that is essentially an extension of its respective stem end 31a, 31b and with pairs of branch tines 34a, 34b, respectively, on either side of each main tine 33a, 33b. Each stem end 31a, 31b also has a straight portion extending away from the stem pivot pin 52, an offset portion adjacent thereto and another straight portion leading to its respective main tine 33a, 33b. A safety lock hole 28 passes through each of the handle extension leaves 27, 27 in axial alignment with the stem pivot pin 52 and the centering stop pin 51. A safety pin 29 (which may be secured by a wire or string) can be inserted in the safety lock hole 28 to ensure that the grasping hands 30a, 30b can not close together.

The closer force means 40 applies the force that drives the grasping hands 30a, 30b together. As best seen in FIGS. 1-3 and 7, the closer force means 40 comprises a resilient means, such as coil spring 50, that is placed in compression between a compression sleeve 42 that is slidably mounted on the handle 20 above its first end 22 and a closer sleeve 46 slidably mounted on the handle 20 at its first end 22. The compression sleeve 42 is positioned at a particular location on the handle 20 by means of a detent or similar mechanism, such as a compression sleeve pin 44 secured by a chain 45. The compression sleeve pin 44 is selectively inserted in one of the compression positioning holes 21, 23 passing through the handle 20. In the preferred embodiment, there are a minimum of two positioning holes 21, 23, but several more holes or a clamping mechanism permitting continuously variable positioning of the compression sleeve 42 could be used. This compression adjustment mechanism permits a selected, variable amount of compression force to be developed in the compression spring 50, which, in turn, is delivered to the closer sleeve 46. (Alternatively, the handle 20 could be surrounded by a longer sleeve that would cover and slide along the entire second end 24, being positioned by a spring detent extending outwardly from the handle 20.) As can be seen, the force produced by compression of the spring 50 is, in turn, exerted by the closer sleeve 46 on the inclined exterior surfaces of the stem ends 31a, 31b of the grasping hands 30a, 30b, urging these toward each other. To efficiently transfer the force to the stem ends 31a, 31b, the respective contact surfaces at the mouth 47 of the closer sleeve 46 and the exterior of the stem ends 31a, 31b must be relatively smooth and present limited frictional resistance to relative movement. In the preferred embodiment, it has been found that a spring capable of exerting a force of approximately fifty pounds against the closer sleeve 46 has been found adequate to deliver a suitable closing force to the stem ends 31a, 31b.

The force urging the grasping hands 30a, 30b together is selectively opposed by the trigger means 60, which generally comprises a first link 61a pivotally connected to the main tine 33a and a second link 61b pivotally connected to the main tine 33b. The two links 61a, 61b are releasibly joined at a cup 62, which is attached by welding or other suitable means to the butt end 63 of the first link 61a. The point 64 of the second link 61b is inserted in the cup 62 and is captured by the cup 62, including the shortened lip 66 on one side of the cup 62. The first link 61a is limited in its pivoting action so that it pivots downward (away from the closer sleeve 46) slightly more than ninety degrees relative to the main tine 33a. The amount of force required for triggering increases as the first link 61a pivots past the ninety-degree position. The triggering force is also affected by the tightness of the fit of the cup 62 around the point 64 of the second link. To avoid premature triggering when the invention 10 is deployed through water, these factors are adjusted so that a force of about one to two pounds must be exerted against the trigger 60 to trip it.

As best seen in FIGS. 1, 4 and 5, the geometry of the grasping ends 32a, 32b and the links 61a, 61b is such that the trigger means 60 operates as an over-center mechanism that effectively opposes the closing force delivered by the closer sleeve 46 until contact with a fish 70 or other object causes the links 61a, 61b to pivot in the direction of the closer sleeve 46. As the links 61a, 61b rotate, they pass over the center point at which they are effective to oppose the closing force. Once past this point, the links 61a, 61b pivot toward alignment with their respective main tines 33a, 33b (FIG.6). (Because the point 64 is curved or rounded, the resistance to movement past the center point is minimal.) The links 61a, 61b are thus moved out of the way, and the grasping hands 30a, 30b pivot rapidly toward each other until they contact the fish 70 or other object that tripped the trigger means 60. The fish 70 or other object becomes firmly grasped between the grasping ends 32a, 32b, which continue to be subject to a closing force exerted by the closer sleeve 46. (This occurs because the compression force in the spring 50 is not completely relieved by the short travel of the closer sleeve 46 along the stem ends 31a, 31b from the pretriggering position in FIG. 3 to the post-triggering position in FIG. 7. Thus, the closer sleeve 46 remains in position enclosing the stem ends 31a, 31b and preventing them from being pried apart until the closer sleeve 46 is withdrawn.) In the preferred embodiment, the main tines 33a, 33b and the branch tines 34a, 34b have small teeth or other roughened surfaces (not shown) to enhance their grasp. Thus, the fish 70 or other object remains firmly held until the action of the closer sleeve 46 is released.

In operation, the invention is used as follows. The compression spring 50 is relieved of some or all of the compression on it by releasing the compression sleeve 42. The grasping hands 30a, 30b are pried apart manually so that the links 61a, 61b of the trigger means 60 can be pivoted to stand substantially perpendicular to the respective main tines 33a, 33b, to which each is pivotally connected. The point 64 is inserted in the cup 62 and the links 61a, 61b are positioned so that they lie beyond the release center point. (When prepared for triggering, the links 61a, 61b meet at an angle of just slightly less than one-hundred eighty degrees opening back toward the closer sleeve 46. The center point for triggering is passed when this angle exceeds one hundred eighty degrees.) For safety, the safety pin 29 is next inserted in the safety pin hole 28. Next, the compression sleeve 42 is slid along the handle 20 in the direction of closer sleeve 46 to the location of one of the compression sleeve position holes 21, 23. The location selected determines the amount of compression in the spring 50; the closer the location of the compression sleeve position hole 21, 23 to the closer sleeve 46, the greater the closing force exerted. The location of the compression sleeve 42 is secured by insertion of the compression sleeve pin 44 in a hole 21, 23. In this state, the invention 10 can be safely moved to and held at the point of anticipated use.

To deploy the invention 10, the user places the lanyard 26 around the user's wrist and removes the safety pin 29. The invention 10 is thrust at a fish 70 or other object to be captured in such a manner that the cup 62 of the trigger means 60 (or a point closely adjacent the cup 62) will be the first thing to contact the fish 70 or other object. The thrusting motion imparted to the invention 10 together with the structure of the trigger means 60 causes the trigger means 60 to pass over its centerpoint and to release the closing force exerted by the spring 50 and the closer sleeve 46 on the grasping hands 30a, 30b. Except in cases of poor aim or extremely quick movement by the fish 70 or other object to be captured, the grasping ends 32a, 32b will close in quickly from either side and grasp the fish 70 or other object. While the present invention can be expected to be most effective when it is deployed over a very short distance, if the user wishes to hurl it a short distance more like a spear, then the lanyard 26 would be replaced by a longer control line (not shown).

While the primary expected use of the invention is in catch and release fishing or in handling fish or other animals for commercial fishing or wildlife management, the device may also be used as a personal defense weapon by individuals or law enforcement personnel. For these latter purposes, the handle 20 would be shorter, so that the device would somewhat resemble an umbrella. It could then be directed at a hand, arm or other appendage of an attacker or a person to be subdued. When constructed with stronger springs, the device could also be employed for protection against and in training of larger animals, as for example in zoos or circuses.

Those skilled in the art will recognize that the present invention could be constructed with a somewhat different trigger mechanism or with a different means of exerting a force on the closer sleeve. For example, the trigger mechanism 60 could be spring loaded rather than based on an over center principle, and the coil spring 50 could be replaced by a different type of resilient member. Accordingly, the present invention is not limited by the above description of the preferred embodiment, but rather by the claims set forth below.

I claim:

1. An apparatus for releasibly grasping objects comprising:
   an elongated handle having first and second ends;
   a pair of grasping hands, each hand having a stem end pivotally connected to the first end of the handle and a grasping end and both hands being pivotally connected to the first end of the handle at a single pivot axis;
   closer force means operably connected to the handle and the grasping hands for selectively exerting a force tending to bring together the grasping ends of the grasping hands, said closer force means comprising a closer sleeve surrounding the stem ends of the grasping hands and resilient means for urging the closer sleeve to move along the stem ends of the grasping hands in the direction of the grasping ends, the resilient means comprising a coil spring encircling the handle, with a first end engaging the closer sleeve and a second end engaging a compression mechanism selectively positionable along the handle to compress the coil spring or release it from compression; and
   trigger means operably connected to the grasping hands for selectively opposing the force means and holding the grasping ends of the grasping hands apart, said trigger means being responsive to contact with an object located between the grasping ends of the grasping hands to cease selectively opposing the force means and to permit the grasping ends to pivot rapidly toward each other.

2. An apparatus as recited in claim 1 wherein the resilient means comprises a spring for selectively engaging the closer sleeve.

3. An apparatus as recited in claim 1 wherein the trigger means comprises a first trigger link pivotally connected to one of said grasping hands and positionable to have a free end extend generally perpendicular to said one grasping hand and toward the other grasping hand and a second trigger link pivotally connected to said other grasping hand and positionable to have a free end extend generally perpendicular to said other grasping hand and toward said one grasping hand, the free ends of said first and second trigger links being engagable to form an over-center trip mechanism that resists the closer force means until tripped.

4. An apparatus as recited in claim 1 wherein each grasping hand comprises a plurality of object engaging tines extending from said stem end.

5. An apparatus as recited in claim 4 wherein the plurality of object-engaging tines of each grasping hand lies in a plane generally perpendicular to the direction in which the closer force means urges each respective grasping hand to move.

6. An apparatus for releasibly grasping objects comprising:
   an elongated handle having first and second ends;
   a pair of grasping hands, each hand having a stem end pivotally connected to the first end of the handle and a grasping end, the grasping hands being pivotally connected to the first end of the handle at a single pivot axis and each stem end of each grasping hand including a stem-stop tab adjacent said single pivot axis for engaging a centering pin that limits the extent to which the grasping hands can pivot apart;
   closer force means operably connected to the handle and the grasping hands for selectively exerting a force tending to bring together the grasping ends of the grasping hands; and
   trigger means operably connected to the grasping hands for selectively opposing the force means and holding the grasping ends of the grasping hands apart, said trigger means being responsive to contact with an object located between the grasping ends of the grasping hands to cease selectively opposing the force means and to permit the grasping ends to pivot rapidly toward each other.

7. An apparatus as recited in claim 6 wherein the closer force means comprises:
   a closer sleeve surrounding the stem ends of the grasping hands; and
   resilient means for urging the closer sleeve to move along the stem ends of the grasping hands in the direction of the grasping ends.

8. An apparatus as recited in claim 7 wherein the resilient means comprises a spring for selectively engaging the closer sleeve.

9. An apparatus as recited in claim 7 wherein the resilient means comprises a coil spring encircling the handle, with a first end engaging the closer sleeve and a second end engaging a compression mechanism selectively positionable along the handle to compress the coil spring or release it from compression.

10. An apparatus as recited in claim 9 wherein the compression mechanism is selectively positionable at at least two different locations along the handle to cause two different amounts of compression of the coil spring.

11. An apparatus as recited in claim 6 wherein the trigger means comprises a first trigger link pivotally connected to one of said grasping hands and positionable to have a free extend generally perpendicular to said one grasping hand toward the other grasping hand and a second trigger link pivotally connected to said other grasping hand and positionable to have a free end extend generally perpendicular to said other grasping hand toward said one grasping hand, the free ends of said first and second trigger links being engagable to form an over-center trip mechanism that resists the closer force means until tripped.

12. An apparatus as recited in claim 6 wherein each grasping hand comprises a plurality of object engaging tines extending from said stem end.

13. An apparatus as recited in claim 12 wherein the plurality of object-engaging tines of each grasping hand lies in a plane generally perpendicular to the direction in which the closer force means urges each respective grasping hand to move.

14. An apparatus as recited in claim 1 wherein the compression mechanism is selectively positionable at at least two different locations along the handle to cause two different amounts of compression of the coil spring.

15. An apparatus for releasibly grasping objects, comprising:

an elongated handle having first and second ends;

a pair of grasping hands, each hand having a stem end pivotally connected to the first end of the handle and a grasping end;

closer force means operably connected to the handle and the grasping hands for selectively exerting a force tending to bring together the grasping ends of the grasping hands, said closer force means comprising a closer sleeve surrounding the stem ends of the grasping hands and resilient means for urging the closer sleeve to move along the stem ends of the grasping hands in the direction of the grasping ends; and trigger means operably connected to the grasping hands for selectively opposing the force means and holding the grasping ends of the grasping hands apart, said trigger means comprising a first trigger link pivotally connected to one of said grasping hands and positionable to have a free end extend generally perpendicular to said one grasping hand and toward the other grasping hand and a second trigger link pivotally connected to said other grasping hand and positionable to have a free end extend generally perpendicular to said other grasping hand and toward said one grasping hand, the free ends of said first and second trigger links being engagable to form an overcenter trip mechanism that resists the closer force means until tripped, said trigger means being responsive to contact with an object located between the grasping ends of the grasping hands to cease selectively opposing the force means and to permit the grasping ends to pivot rapidly toward each other.

* * * * *